(12) United States Patent
Batson, Jr.

(10) Patent No.: US 9,813,858 B2
(45) Date of Patent: Nov. 7, 2017

(54) SYSTEM AND METHOD FOR WIRELESS COMMUNICATIONS ACTIVITY WITHIN A PREDETERMINED AREA AND FOR GENERATING MESSAGES TO SELECTED COMMUNICATION DEVICES

(71) Applicant: AT&T Mobility II LLC, Atlanta, GA (US)

(72) Inventor: Winton Durrett Batson, Jr., Brentwood, TN (US)

(73) Assignee: AT&T Mobility II LLC, Atlanta, GA (US)

( * ) Notice: Subject to any disclaimer, the term of this patent is extended or adjusted under 35 U.S.C. 154(b) by 0 days.

(21) Appl. No.: 15/212,886

(22) Filed: Jul. 18, 2016

(65) Prior Publication Data
US 2016/0330582 A1 Nov. 10, 2016

Related U.S. Application Data

(60) Division of application No. 14/324,163, filed on Jul. 5, 2014, now Pat. No. 9,398,457, which is a division
(Continued)

(51) Int. Cl.
*H04M 1/66* (2006.01)
*H04W 12/06* (2009.01)
(Continued)

(52) U.S. Cl.
CPC ............ *H04W 4/021* (2013.01); *H03M 1/12* (2013.01); *H04W 4/02* (2013.01); *H04W 4/027* (2013.01);
(Continued)

(58) Field of Classification Search
CPC ....... H04W 4/021; H04W 4/02; H04W 4/027; H04W 4/12; H04W 12/08; H04W 12/06;
(Continued)

(56) References Cited

U.S. PATENT DOCUMENTS

| 5,878,038 A | 3/1999 | Willey |
| 6,577,229 B1 * | 6/2003 | Bonneau ............. G06K 7/0008 235/379 |

(Continued)

OTHER PUBLICATIONS

Office Action mailed Aug. 30, 2006 in U.S. Appl. No. 10/752,777.
(Continued)

*Primary Examiner* — Khai M Nguyen
(74) *Attorney, Agent, or Firm* — Hartman & Citrin LLC

(57) ABSTRACT

A system and method is disclosed for detecting the presence and level of wireless communications activity within a predetermined area, without disclosing the identity of the wireless users, and for generating a message to certain information and communications devices in response to the detection of a predetermined level of wireless communications activity within the predetermined area. The information detected also may include information relating to the general direction and rate of movement of detected wireless devices. The message generated in response to the detection of wireless communications activity may include wireless messages, including Short Message Service (SMS) messages, to persons desiring or needing to receive such information; messages to public officials and other interested persons; and automatic signals to devices such as computers, computer networks (including the internet and wireless networks), facsimile machines, signs, lights, loudspeakers, and other devices providing information through other communication and information media.

10 Claims, 4 Drawing Sheets

Related U.S. Application Data of application No. 13/690,465, filed on Nov. 30, 2012, now Pat. No. 8,774,832, which is a continuation of application No. 13/309,035, filed on Dec. 1, 2011, now Pat. No. 8,346,285, which is a continuation of application No. 10/752,777, filed on Jan. 7, 2004, now Pat. No. 8,090,387.

(51) Int. Cl.
  *H04W 4/02*    (2009.01)
  *H03M 1/12*    (2006.01)
  *H04W 12/08*   (2009.01)
  *H04W 24/00*   (2009.01)
  *H04W 64/00*   (2009.01)
  *H04W 4/12*    (2009.01)

(52) U.S. Cl.
  CPC ............ *H04W 4/12* (2013.01); *H04W 12/06* (2013.01); *H04W 12/08* (2013.01); *H04W 24/00* (2013.01); *H04W 64/00* (2013.01); *H04W 64/006* (2013.01)

(58) Field of Classification Search
  CPC ... H04W 24/00; H04W 64/00; H04W 64/006; H03M 1/12
  USPC ............ 455/411, 456.3, 414.2, 550.1, 410; 341/155, 126
  See application file for complete search history.

(56) References Cited

U.S. PATENT DOCUMENTS

| | | | |
|---|---|---|---|
| 6,845,246 B1 | 1/2005 | Steer | |
| 8,090,387 B1* | 1/2012 | Batson, Jr. | H04W 4/02 |
| | | | 455/414.2 |
| 8,346,285 B2* | 1/2013 | Batson, Jr. | H04W 4/02 |
| | | | 340/506 |
| 8,774,832 B2* | 7/2014 | Batson, Jr. | H04W 4/02 |
| | | | 455/414.2 |
| 9,398,457 B2* | 7/2016 | Batson, Jr. | H04W 4/02 |
| 2002/0061738 A1 | 5/2002 | Simmons | |
| 2002/0098860 A1 | 7/2002 | Pecen et al. | |
| 2003/0196154 A1 | 10/2003 | Grandi | |
| 2004/0137959 A1 | 7/2004 | Salzhauer et al. | |
| 2004/0185864 A1 | 9/2004 | Balachandran et al. | |
| 2004/0219932 A1 | 11/2004 | Verteuil | |
| 2006/0073824 A1 | 4/2006 | Ranganathan et al. | |
| 2006/0183420 A1 | 8/2006 | Solum | |
| 2007/0281712 A1 | 12/2007 | Povey et al. | |
| 2009/0156227 A1* | 6/2009 | Frerking | H04B 7/0691 |
| | | | 455/455 |
| 2009/0275347 A1 | 11/2009 | Creemer | |
| 2011/0171976 A1 | 7/2011 | Creemer | |

OTHER PUBLICATIONS

Office Action mailed Apr. 10, 2007 in U.S. Appl. No. 10/752,777.
Office Action mailed Jan. 17, 2008 in U.S. Appl. No. 10/752,777.
Office Action mailed Oct. 1, 2008 in U.S. Appl. No. 10/752,777.
Office Action mailed May 5, 2011 in U.S. Appl. No. 10/752,777.
Notice of Allowance mailed Aug. 23, 2011 in U.S. Appl. No. 10/752,777.
Office Action mailed Apr. 23, 2012 in U.S. Appl. No. 13/309,035.
Notice of Allowance mailed Aug. 28, 2012 in U.S. Appl. No. 13/309,035.
Office Action mailed Sep. 26, 2013 in U.S. Appl. No. 13/690,465.
Notice of Allowance mailed Mar. 5, 2014 in U.S. Appl. No. 13/690,465.
U.S. Office Action dated Sep. 21, 2015 in U.S. Appl. No. 14/324,163.
U.S. Notice of Allowance dated Mar. 8, 2016 in U.S. Appl. No. 14/324,163.

* cited by examiner

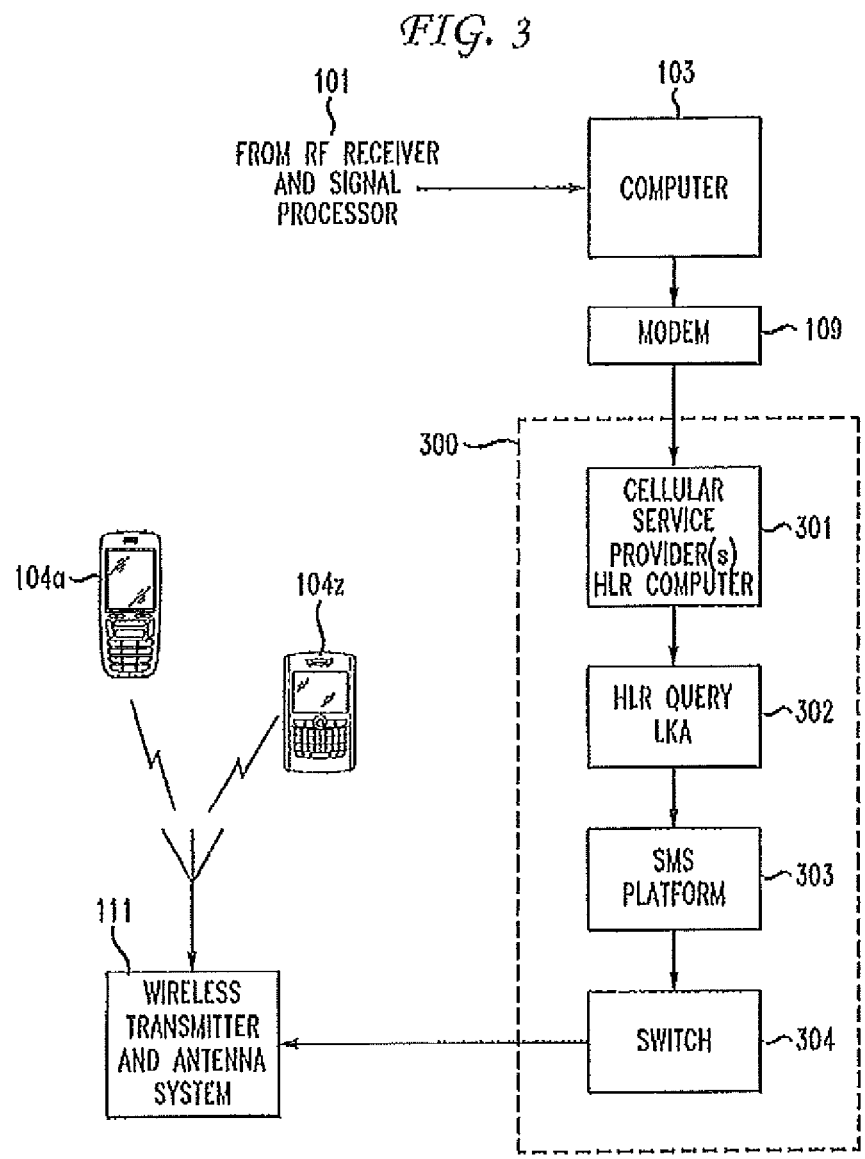

SYSTEM AND METHOD FOR WIRELESS COMMUNICATIONS ACTIVITY WITHIN A PREDETERMINED AREA AND FOR GENERATING MESSAGES TO SELECTED COMMUNICATION DEVICES

CROSS-REFERENCE TO RELATED APPLICATIONS

This patent application is a division of and claims priority to U.S. patent application Ser. No. 14/324,163, filed Jul. 5, 2014, now U.S. Pat. No. 9,398,457, which is a division of and claims priority to U.S. patent application Ser. No. 13/690,465, filed Nov. 30, 2012, now U.S. Pat. No. 8,774,832, which is continuation of and claims priority to U.S. patent application Ser. No. 13/309,035, filed Dec. 1, 2011, now U.S. Pat. No. 8,346,285, which is a continuation of and claims priority to U.S. patent application Ser. No. 10/752,777, filed Jan. 7, 2004, now U.S. Pat. No. 8,090,387, all of which are incorporated herein by reference in their respective entireties.

BACKGROUND OF THE INVENTION

Field of the Invention

The present invention relates to the field of enabling observers to detect and analyze the level of wireless communications activity within a predetermined area without disclosing to those observers the identity of individual wireless users, and generating messages from the observers to specific communication devices when the wireless communications activity detected within the predetermined area meets predetermined conditions.

Description of the Related Art

Carrying mobile wireless communications devices has become customary by a substantial proportion of persons in society. Generally, these wireless devices are turned on and in communication with the wireless service provider or wireless network (are active) so that their users can send and receive wireless communications. These mobile wireless communications devices are commonly carried by individuals while travelling in automobiles, shopping, or conducting other daily activities. Additionally, the development of technologies such as WIFI wireless computer networks has resulted in the increased availability of wireless computer networks enabling people to use their mobile wireless communications devices in many more places such as airports, hotels, and dining establishments.

The present state of the art in wireless communications enables wireless service providers and wireless networks to identify all active wireless devices in communication either through a wireless service provider with a cellular wireless system or through a wireless network. In the case of cellular wireless communications, the identifying information typically available to the cellular wireless service provider regarding each cellular wireless device includes the identity of the subscriber, the wireless address of the subscriber, the identity of the subscriber's home cellular wireless service provider, and related information regarding the services available to the subscriber. This information is obtained by periodic communications between the active cellular wireless device and the cellular wireless system providing service within the cell, and, in the case of a roaming subscriber, further communication between the cellular wireless service provider providing service within the cell and the home cellular service provider for the specific device.

Wireless devices generally may be located by methods of radio direction finding, or, in the case of cellular wireless communications, triangulation among the cellular wireless system cells with which the cellular wireless device is in communication. Additionally, the present state of the art enables cellular wireless service providers to determine the identity and location of certain specific cellular wireless devices by reference to GPS devices incorporated into those cellular wireless devices.

By detecting the presence of active wireless devices in a predetermined area it is therefore possible to approximate the number of persons located in that area, as well as their movement. This information, which is of both commercial and non-commercial value, is useful for deciding whether to generate messages to the detected group of persons or to other persons or groups of persons. For example, if a substantial number of wireless users are located in vehicles on a highway, then that information could enable the Department of Transportation to operate signs along the highway in the congested area providing alternative routing related to traffic congestion.

There also may be circumstances under which it is desirable to provide this information to wireless users within other areas. Thus, evaluating the population and movement in one predetermined area, it may be desirable to generate messages to persons in other areas. For example, motorists can also be advised directly by wireless messages of traffic congestion and potential delays in areas of interest before reaching those areas.

Additionally, based on detection of a threshold level of wireless communications activity in a predetermined area, commercial entities may wish to communicate through the cellular wireless network providing service in that area or through a local wireless network to send wireless messages, such as SMS messages, to those wireless devices configured for receipt of such messages and authorizing such messages, regarding nearby businesses or facilities and their products or services.

Generally, privacy concerns exist regarding any dissemination of information disclosing the identity of wireless device users in communication with a cellular wireless service provider or local wireless network. In the case of cellular wireless communications, because of concerns for the privacy of cellular wireless subscribers, information obtained using the state of the art systems and methods regarding the identity and location of individual cellular wireless devices is not disclosed to the public, despite its value. Instead this information is only available to the cellular wireless service providers for their operational purposes and to certain persons, typically governmental entities, otherwise having lawful access to such information, and to specified third persons with the consent of the subscriber. Therefore, a previously unsatisfied need exists in the wireless communications field to obtain and make available anonymous real-time information regarding the level of wireless communications activity within a predetermined area. This information can be used by third parties for both its commercial and non-commercial value; that is, to enable interested observers to detect the level of wireless communications activity within a predetermined area, without disclosing the identity of individual wireless users. This information could be used to generate messages to wireless subscribers and others having a need or indicating a desire to receive information such as public safety and traffic information, or information relating to events, facilities or services in that particular area.

SUMMARY OF THE INVENTION

Generally, the present invention includes a system and method of detecting and analyzing the level of wireless communications activity within a predetermined area, without identifying the specific wireless devices. The present invention is applicable to all cellular and wireless communications activity regardless of the specific applicable wireless technology, including but not limited to CDMA, TDMA, GSM, GPRS, and other wireless communications technologies. These wireless technologies include digital and analog cellular wireless communications in the 800-900 MHz range, PCS cellular communications in the 1.8-2.0 GHz range, and any other digital or analog wireless communications for use on any other frequency that is currently or may in the future be allocated to wireless communications activity, including, for example, MOBITEX, MMDS or WIFI frequencies. The present invention generates an output control signal based upon a comparison of the detected wireless communications activity to a predetermined threshold or predetermined conditions.

Embodiments of the present invention generate an output control signal that may control and direct a cellular wireless telecommunications system to generate and broadcast cellular wireless messages, including short message service (SMS) messages, to selected consenting cellular wireless subscribers, or the output control signal may control other information devices to generate messages through other media, such as, but not limited to, computer networks (including the internet or wireless local area networks), facsimile, telephone, visual signal devices, and audible signal devices. Embodiments of the present invention also provide a firewall to allow the messages to be directed to wireless receivers without disclosing the identity or the precise location of the individual detected wireless users or of message recipients within the predetermined area, either to the person generating the message or the person receiving the message, thereby assuring confidentiality, security and privacy for individual wireless users.

Additionally, the state of the art in cellular wireless telecommunications technology permits querying the cellular wireless devices within a predetermined wireless cell or cells. The query may determine whether those queried cellular wireless devices are configured to receive certain types of messages, e.g., SMS and other forms of digital messages, and whether their users are desirous of receiving such messages. By combining this state of the art technology with the apparatus and process for identifying the level of wireless communications activity and the approximate number of persons within a predetermined area, messages may be generated to those properly configured cellular wireless devices whose users desire to receive that information.

Embodiments of the present invention provide a system and a method for providing the desired information by receiving and analyzing radio frequency transmissions from wireless devices within a predetermined area without demodulating the wireless signals and identifying the particular wireless devices. Instead, these embodiments of the present invention process the foregoing information to determine the level and characteristics of the detected, but anonymous, wireless communications activity within a predetermined area. In this manner, the anonymity and privacy of wireless device users within the predetermined area is preserved. The detected level and characteristics of the received wireless signals are analyzed and compared with predetermined threshold conditions relating to the detected wireless communications activity that have been established by an interested observer, such as a business or public entity. The resultant comparison causes the system to generate an output control signal when the threshold conditions are satisfied. The output control signal then causes a related communication device to provide appropriate messages to interested persons.

In the event that the interested observer, such as a business or a public entity, wishes to transmit cellular wireless messages to interested persons within one or more predetermined cells, the output control signal either generates or releases a message to be transmitted to cellular wireless devices within predetermined cells or sectors. This is done by communicating with a computer that either generates or stores the messages which are then communicated to the cellular wireless system(s) providing service for the desired cells or sectors. A further computer associated with each cellular wireless service provider receives these messages and the Home Location Registry (HLR) for each cellular wireless provider can then determine which cellular wireless devices and users are located in the desired cells or sectors, and meet certain selected criteria, such as the capability of the identified device to receive certain types of cellular wireless messages, and which users may choose to receive the information, indeed, under certain circumstances, public officials in emergency situations wish to generate messages to all cellular wireless device users within the relevant cells or sectors. Authorized messages can then be sent to those cellular wireless devices that meet the selected criteria. These authorized messages are transmitted by the wireless service provider without disclosing the identity of the message recipients to the sender, or enabling unauthorized communications by the senders directly to those cellular wireless device users, thereby preserving confidentiality, security and privacy.

BRIEF DESCRIPTION OF THE DRAWINGS

FIG. 3 is a block diagram of an interface between the computer of FIG. 1 and a cellular wireless communications system.

DETAILED DESCRIPTION OF THE INVENTION

Figure 1:
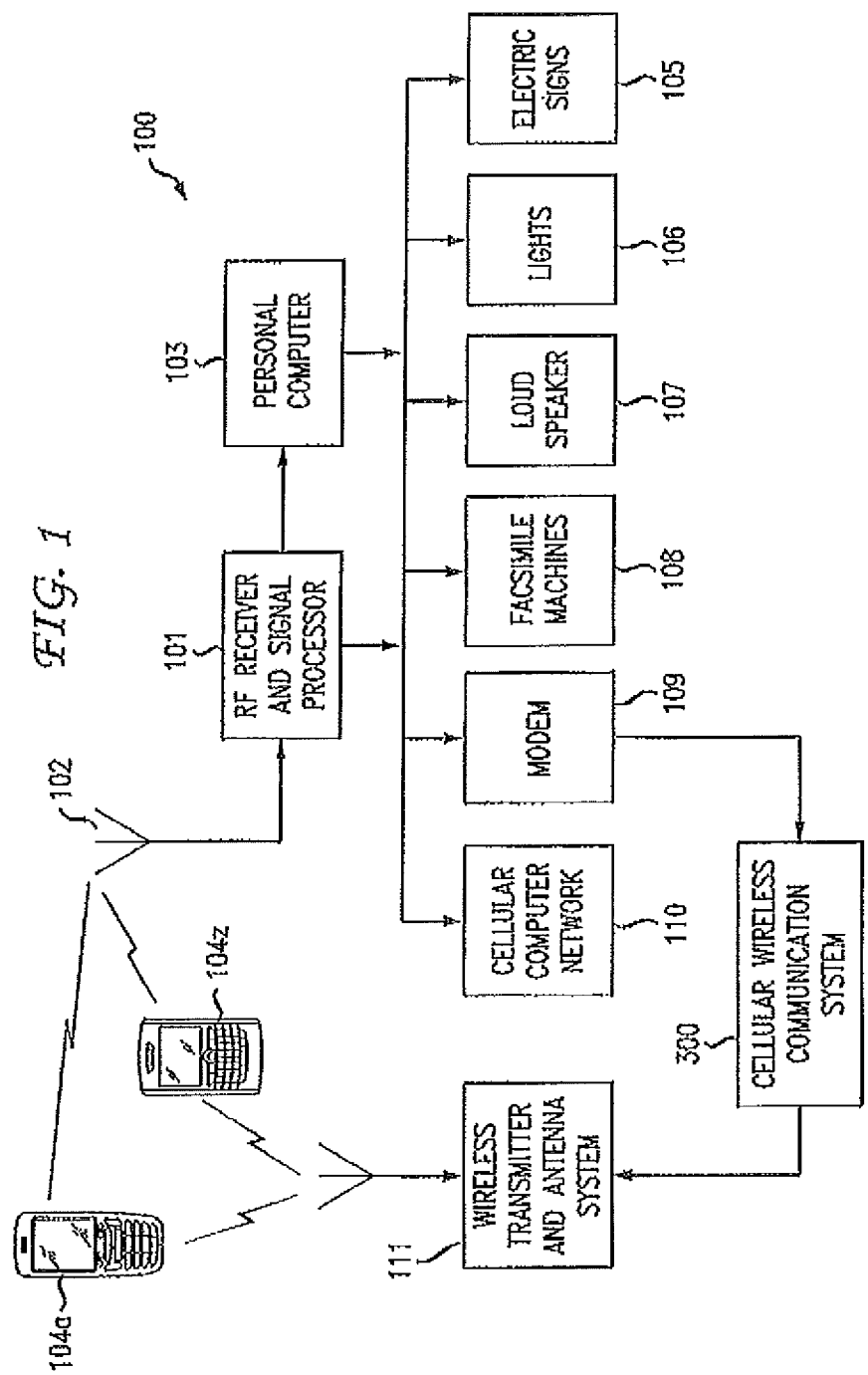
FIG. 1 is a block diagram of an exemplary embodiment of the present invention.

The present invention will now be described in detail by reference to the various exemplary embodiments as disclosed in the drawings. In referring to the drawings, the numbered components described in the Detailed Description of the Invention refer to like numbered components depicted in the drawings.

Referring now to FIG. 1, an exemplary embodiment of the system 100 includes a radio frequency (RF) receiver and signal processor 101 and antenna system 102. A computer 103 also may be included; however, in alternative embodiments as will be explained by reference to FIGS. 2A and 2B, the RF Receiver and signal processor 101 may provide the desired control signal output without further processing by a computer 103. The RF receiver and signal processor 101 is capable of scanning wireless communications frequencies to detect and process wireless signals from wireless communications devices 104a, . . . 104z. Processing these signals does not require demodulation of communications, but merely detection of uplink signals generated by the wireless devices, 104a . . . 104z.

The antenna system 102 is placed at a location based upon the area in which wireless communications activity is to be detected. For example, if a larger area is to be detected, the antenna system 102 may be placed on the top of a tall building or structure. If a smaller area is to be detected, the antenna system 102 may be placed closer to the ground or even within a structure or room. If only cellular wireless devices 104a, . . . 104z in a particular direction are to be detected, then a highly directional antenna system 102 may be used. If wireless devices 104a . . . 104z in more than one direction are to be detected, then a multidirectional or omnidirectional antenna system 102 may be used.

The RF receiver and signal processor 101 may be capable of detecting and processing wireless device signals transmitted on one frequency or on multiple frequencies. The RF receiver and signal processor 101 may be capable of detecting cellular or other wireless communications regardless of the specific applicable wireless technology, including but not limited to CDMA, TDMA, GSM, GPRS and other wireless communications technologies, and on any frequency that currently or in the future may be allocated to wireless communications, including by way of example MOBITEX, MMDS or WIFI frequencies. In the present embodiment, for example, cellular voice messages are typically transmitted at 837 MHz, PCS message signals are typically transmitted at 1880 MHz. Persons within the predetermined area of reception may have either device and therefore the RF receiver and processor 101 may be capable of detecting wireless devices 104a . . . 104z at either frequency and generating one or more control signal outputs based upon detection and evaluation of transmissions on both frequencies.

Figure 2A:
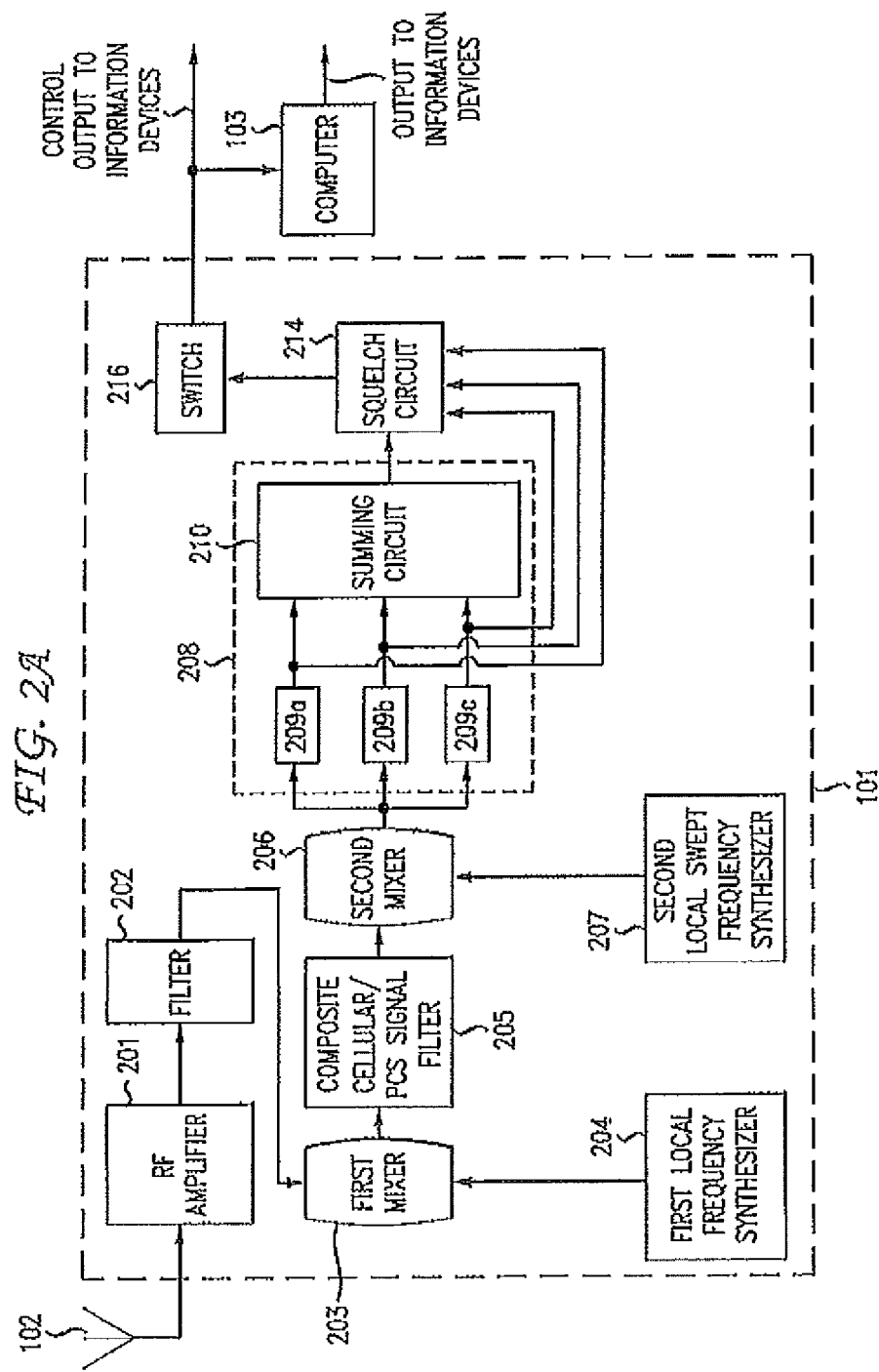
FIG. 2A is a block diagram of a first exemplary embodiment of the receiver and signal processor of FIG. 1.
Figure 2B:
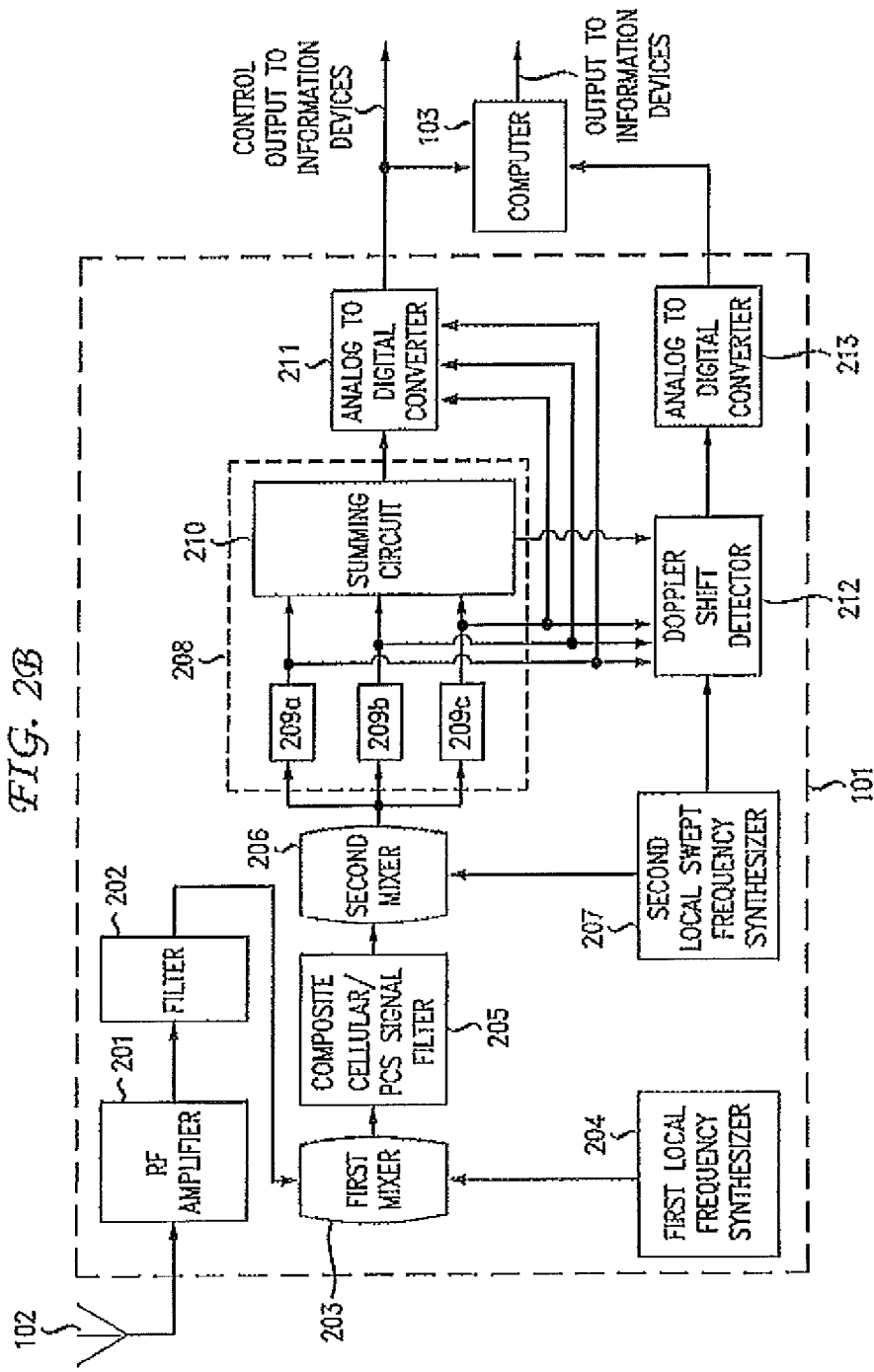
FIG. 2B is a block diagram of a second exemplary embodiment of the receiver and signal processor of FIG. 1.

Referring now to FIGS. 2A and 2B, if signals from devices on two frequencies are to be detected and evaluated, these signals then may be combined in the RF receiver and signal processor 101 to produce one combined signal that corresponds to the measurement and evaluation of the communications activity from all of the wireless devices from which transmissions are detected on either frequency within the predetermined reception area. A typical RF receiver and signal processor 101 adapted to process signals at two different frequencies, for example, cellular voice communications and PCS communications, may include an RF amplifier 201 and one or more highly selective cellular/PCS band filters 202 from which the signals are routed to a first mixer 203 and a first local frequency synthesizer 204 that introduces a frequency that is one-half the difference between the PCS mid-band frequency and the cellular voice mid-band frequency. With the PCS mid-band frequency of 1880 MHz and the cellular voice mid-band frequency of 837 MHz, the difference between the two signals is 1123 MHz. Half of that difference is 521.5 MHz, which is the frequency selected for the first local frequency synthesizer 204 to be combined with the PCS and cellular RF signals at the first mixer 203. When that generated signal of 521.5 MHz is mixed by the first mixer 203 with the PCS mid-band frequency of 1800 MHz, the result is a signal at the frequency of 1358.5 MHz. When mixed by the first mixer 203 with the cellular mid-band frequency of 837 MHz, a signal is also produced at the same frequency of 1358.5 MHz. The output from the first mixer 203 therefore is a composite RF output centered at 1358.5 MHz that contains the sum of all communications activity from all of the cellular wireless devices 104a, . . . 104z on both frequency ranges detected in the predetermined area.

It will be understood that if only one frequency is to be detected, the foregoing circuit may be provided without a first mixer 203 and first frequency synthesizer 204. It also will be understood by those skilled in the art that similar signal processing circuits combining signals on other pairs of detected frequencies may be provided using this method of dividing the difference between the frequencies by two and combining that quotient with each of the detected frequencies to provide a composite RF output common frequency. Additionally, if the RF receiver and signal processor 101 is to process signals on more than two frequencies, it may include one or more additional circuits as shown in FIGS. 2A and 2B, either in parallel or in series, for combining the signals at different frequencies to produce additional or further combined signals, or it may include multiple RF receivers and signal processors such as those shown in FIGS. 2A and 2B, each receiving and processing signals on additional frequencies or combinations of frequencies. The decision to use separate receivers, rather than merely providing additional signal processing circuits, may depend on the proximity of the frequencies to be received and processed within the RF receiver and signal processor 101, antenna capabilities and characteristics, or the type of communications, for example, voice or data.

The processed RF output, in the case of FIGS. 2A and 2B, the composite RF output generated from the first mixer 203, may then be introduced into a second composite cellular/PCS signal filter 205 that passes only the wide band composite signals centered at 1358.5 MHz. From the second composite cellular/PCS signal filter 205, the composite RF output may then be fed to a second mixer 206. The second mixer 206 mixes the composite RF output signal with the output from a second local swept frequency synthesizer 207 having a frequency close to that of the combined frequency, such as 1313.5 MHz, to produce a substantially lower intermediate frequency (IF frequency), such as 45 MHz, which IF frequency is chosen to provide maximum image rejection and cost-effective processor construction. The composite RF output signal is swept over the entire bandwidth range to determine the number of component signals. The second mixer 206 therefore produces a composite RF output having a signal reflecting the combined communications activity from all of the detected wireless devices.

Continuing to refer to both FIGS. 2A and 2B, regardless of whether the RF receiver has detected wireless signals on only one frequency or on multiple frequencies and has produced only one processed RF output signal or has produced one or more composite signals, an intermediate frequency (IF) filter stage 208 may then be provided. The IF filter stage 208 may include one or more bandwidth filters 209a, 209b and 209c. For example, bandwidth filters 209a, 209b and 209c, may be wide (1.2 MHz), medium (200 KHz) and narrow (30 KHz) bandwidth filters, respectively, each corresponding respectively to the bandwidths of CDMA signals (1.2 MHz), GSM signals (200 KHz) and TDMA signals (30 KHz). It will be understood by those skilled in the art that the intermediate frequency (IF) filter stage also may include one or more automatic gain controls (AGC) that measure the strength of each IF stage signal, and one or more selectivity controls to narrow each IF stage signal.

The RF output(s) from the RF amplifier 201, the output(s) from the mixer(s) 203 or 206, or, if present, the output from the individual filters 209a, 209b and 209c, then may be passed to a summing circuit 210, or these outputs may be used directly for purposes of the desired comparison with a threshold signal to determine if an output control signal is to be generated.

Referring now to the exemplary embodiment depicted in FIG. 2A, this comparison may occur in the RF receiver and signal processor 101 by comparing the characteristics of the subject analog signal, such as signal strength, through a squelch circuit 214, with a predetermined threshold to generate an output control signal if the threshold is met. The analog signals from any of the foregoing sources may be passed to the squelch circuit 214 which determines if the signal strength meets a predetermined threshold. If so, the signal may be passed to a switch 216 which, upon detection of the signal from the squelch circuit 214, generates a control output signal either directly to the desired information devices or to a computer 103 for further processing and generation of appropriate control signals to digital communication devices or networks.

Referring now to the exemplary embodiment depicted in FIG. 2B, the output from either the filters 209a, 209b, 209c, or the output from the summing circuit 210 is passed to an analog to digital converter 211 that assigns digital values to the outputs from the summing circuit 210 or the outputs from each of the bandwidth filters 209a, 209b, and 209c. The analog signals reflect signal strength, the number of signals detected and time detected so that the assigned digital values may be based upon any combination of these measured real-time signal parameters. Thus, the assigned digital value may include information such as the observed real-time number or strength of detected signals. The analog to digital converter 211 then generates a first digital signal or a first set of digital signals corresponding to the assigned values. The first digital signals therefore correspond to a measurement and analysis of predetermined signal parameters associated with the real time wireless communications activity detected within the predetermined area.

Continuing to refer to the exemplary embodiment depicted in FIG. 2B, a Doppler shift detector 212 also may be desired in order to enable the measurement of Doppler shift associated with the signals from the intermediate frequency band width filters 209a, 209b and 209c or the intermediate frequency summing circuit 210. A Doppler shift detector 212 is set to the frequency of the second local swept-frequency synthesizer 207 and measures the frequency difference between the synthesizer and the IF stage output from the intermediate frequency band width filters 209a, 209b and 209c or the summing circuit 210 with a peak-tracker. The resultant Doppler frequency shift value will indicate whether the detected cellular wireless devices 104a, . . . 104z are primarily moving toward or away from the antenna system 102, or are moving rapidly, slowly or not at all, relative to the antenna system 102. For example, a positive frequency shift value indicates movement toward the antenna 102, and a negative frequency shift value indicates movement away from the antenna 102. Additionally, a zero or low frequency shift value indicates little or no movement relative to the antenna 102, and a high frequency shift value indicates a rapid rate of movement relative to the antenna 102. The output from the Doppler shift detector 212 also may be passed to an analog to digital converter 213 which assigns an appropriate digital value to the output that reflects the detected Doppler shift and generates a second digital signal to the computer 103.

Upon detecting the presence, level, and, possibly, movement, of signals from active wireless devices within a predetermined reception area, the illustrated embodiments shown in FIGS. 2A and 2B then may pass the output signals derived from the communications activity from all of the detected wireless devices 104a, . . . 104z to a digital comparator. In the embodiment shown in FIG. 2B, the comparator may be a properly programmed computer 103 that compares the output signals produced by the RF receiver and signal processor 101, against predetermined threshold values or conditions, and then generates one or more output control signals to control other information devices. It will be understood, however, by those skilled in the art that the digital comparator may be any digital circuit, either within the processor 101 or separate from the processor 101, that generates a control output signal based on a comparison of the digital values assigned to the signals received and processed within the processor 101 to a predetermined digital value or condition.

In the embodiments shown in FIGS. 1 and 2A and 2B, the computer 103 may be a personal computer programmed to analyze the output from the RF receiver and processor 101. The computer 103 may further be programmed to measure the data over time and may produce a graphical output of the sum of all selected measured or calculated criteria for all activity in all of the bands. For example, a commercial observer may decide that a certain number of potential customers may need to be detected during a predetermined period of time or time of day before initiating a particular message. The commercial observer or observers each may have access to the computer 103 in which to set certain threshold levels and parameters, such as level of wireless communications device activity (approximating a certain number of persons), location, time of day, and direction and rate of movement, before generating a message. It will be understood by those skilled in the art that the RF receiver and signal processor 101 and the computer 103 may be collocated or the computer 103 may be in remote communication with the RF receiver and signal processor 101. Additionally, one or more RF receiver and signal processor units may be providing input to one or more computers for generating one or more output control signals.

The output signal signals from either the switch 216 or the combination of digital signals from each analog to digital converter 211 and 213 received by the computer 103 in real time will provide a multiplicity of values that may be further analyzed and processed by the computer 103. As set forth above, the output from the switch 216 will reflect the presence of communications activity in excess of the threshold level established by the squelch circuit 214. The digital signal values provided by the analog to digital converters 211 and 213 may reflect detected signal parameters, such as the number of signals, signal strength and duration, as well as signal Doppler shift. These signals may be collected by the computer 103 continuously to provide a record of wireless communications activity in the area throughout the day, week, month, year or other period of time, or they may only be collected at predetermined times of the day or at predetermined intervals of time. The collected data then may be analyzed by the programmed computer 103 to identify or calculate certain conditions, such as whether the measured real-time communications activity at any time is greater than a threshold level of activity, e.g., average daily or other periodic communications activity in the predetermined area, or whether the aggregate, average or other analyzed characteristic of the detected communications activity is greater than a threshold, e.g., average daily or periodic communications activity, or any other analyzed or desired condition associated with the detected or analyzed communications activity. The computer 103 also can calculate the change and rate of change in communications activity in the predetermined area based upon this information. It also may analyze all of that information in combination with the information relating to the direction of travel of the communications devices relative to the antenna(s). This data then may be entered into bins on a spreadsheet such as an Excel® spreadsheet, to provide desired reports, or as described below may be used to generate one or more output control signals.

The measured or analyzed data may provide information regarding population and activities within the predetermined area. For example, detection of a large number of wireless devices 104a, ... 104z within the predetermined reception area, e.g., along an interstate highway, may indicate a high volume of traffic on the highway. Contemporaneous detection of a rapid rate of movement of the wireless devices 104a, ... 104z also may indicate that the traffic is travelling at normal highway speeds. Conversely, a high volume of vehicular traffic and a low rate of movement of the wireless devices 104a, ... 104z, may indicate traffic congestion along the highway.

The computer 103 may be programmed to provide different output control signals in response to a multiplicity of detected or analyzed conditions. The output control signals generated in response to those measured or analyzed conditions may also vary such that discrete output control signals may cause varying messages to be generated based upon varying levels and characteristics of detected telecommunications activity. For example, if the digital value is 20% greater than the selected threshold, a first message may be generated; if the digital value is 50% greater than the selected threshold, then a second message may be generated; and so forth.

In alternative embodiments, the devices for providing information in response to detected wireless communication activity may be limitless. Referring still to the exemplary embodiment shown in FIG. 1, observers may want to transmit output control signals to information devices such as electric signs 105, lights 106, loudspeakers 107, facsimile machines 108, computer networks (including the Internet and wireless networks) 110, and other cellular wireless devices (including Short Messages Service (SMS) devices) 104a, ... 104z. In those cases in which the information devices are more traditional, such as electric signs 105, lights 106, loudspeakers 107, and even facsimile machines 108 and computer networks and wireless networks 110, the programmed computer 103 is capable of directly initiating and controlling the communication to those devices and of providing and controlling the messages to be sent by those devices using technology well known to those skilled in the art.

Referring now to FIGS. 1 and 3 together, in the alternative embodiment providing an output control signal to generate a message to cellular wireless devices 104a, ... 104z, the output control signal from computer 103 may initiate communication through a modem 109 with the cellular wireless communication system 300 to direct it to identify cellular wireless devices 104a, ... 104z within a predetermined cell or sector and to query those devices and or the home cellular wireless service provider for those devices, to determine whether those devices are configured to receive the appropriate form of message and have authorized receipt of the intended message. It will be understood that in other exemplary embodiments, it is not necessary that the set of wireless devices detected, be the same set of cellular wireless devices to which communications are to be directed by the computer 103 and wireless communication system 300, but may be any set of desired wireless devices within any desired cellular wireless communications cell or cells, or even within specific sectors within one or more cells, or within any geographic area covered by a wireless communications network.

The function of querying those cellular wireless devices 104a, ... 104z may be undertaken by the cellular wireless communications system 300 through use of an associated computer 301 that is in communication with the computer 103 or other similar RF receiver and processor/computer systems associated with other predetermined areas. When a signal is received by the computer 301 from the computer 103 associated with one of the RF receivers and processors, directing that messages be sent to cellular wireless devices 104a, ... 104z within a particular geographical area, the computer 301 determines from that signal which wireless cells or sectors are to be queried for providing possible wireless messages. Upon identification of the relevant wireless cells or sectors, the computer 301 then queries the Home Location Register 302 to identify those cellular wireless devices 104a, ... 104z whose last known address was in the selected cells or sectors. The query from the computer 301 also may determine whether the cellular wireless device 104a, ... 104z is configured to receive such messages and whether the subscriber has consented or chosen to enable the wireless device 104a, ... 104z to receive messages of the type to be generated, e.g., public service, traffic, or commercial messages. If so, then the desired message as directed by the computer 103 based upon the observers input, is transmitted to the SMS platform 303 and then to the central wireless services switch 304 for transmission by the intended cellular wireless transmitters and antenna systems 111 to those cellular wireless devices 104a, ... 104z configured to receive the message and for which receipt of such methods has been authorized by the wireless device subscriber.

It will be understood that the content of the messages to be provided in response to the output control signal may be predetermined or prepared contemporaneously with or even after receipt of the output control signals. The messages may be originated or stored in the computer 103, or in some other recording or storage device, such a computer terminal, as a part of a computer system in communication with the computer 103 or the cellular communications system 300. The messages also may be originated or stored in the information devices 105, 106, 107, 108 or 110. Each of these messages then may be broadcast or transmitted by the information devices in response to the output control signal indicating that the threshold level of activity and other conditions have been satisfied by the detection and analysis of wireless communications activity within the predetermined area.

In the case of transmitting cellular wireless messages, the message may be in the form of a prerecorded voice message, but, preferably, it will be in the form a short prerecorded text (SMS) message. The content of these messages may be prerecorded by the observer and stored on the computer 103. In response to the output signal resulting from the comparison of the detected cellular wireless telecommunications activity to the predetermined threshold or other conditions, the computer 103 communicates through a modem 109 to the central wireless communications switching system 300 to initiate transmission of the prerecorded messages to those cellular wireless devices 104a ... 104z, which are configured to receive such messages and to which such messages are authorized by the wireless device subscriber. The message also may include a telephone number, wireless address or a reply function to enable the subscriber to selectively initiate communications directly with the originator to obtain or transmit additional information between the wireless subscriber and the message originator.

The communications between the computer 103, associated with the observer, and the computer 301, associated with the cellular wireless service 300, do not include any transmission of any information identifying the specific wireless devices detected or identifying the specific cellular wireless devices 104a, . . . 104z to which information has been transmitted. As such, these two separate computers 103 and 301, one controlled by the observer and the other by the cellular wireless service provider, act as a firewall to prevent the unintended or unauthorized disclosure of information regarding the identity and location of cellular wireless device subscribers in the predetermined area, or the identity and location of cellular wireless devices 104a, . . . 104z in the area to which messages have been transmitted by the wireless communications system.

It will be appreciated by those skilled in the art that the foregoing alternative embodiments are merely exemplary and that other embodiments including also other equivalents, variations and modifications of these embodiments, fall within the scope of the present invention. Accordingly, all such equivalents, variations and modifications are intended to be included within the scope of the present inventions and to be protected by the following claims.

What is claimed is:

1. A method comprising:
   receiving, by a system including a processor, in aggregate, a plurality of wireless radio-frequency signals transmitted from a plurality of wireless communication devices within a predetermined area;
   generating, by the system, without demodulating the plurality of wireless radio-frequency signals, a digital electrical signal based on the plurality of wireless radio-frequency signals from the plurality of wireless communication devices in the predetermined area;
   assigning, by the system, a value to the digital electrical signal, the value comprising information indicating a time of receipt of the plurality of wireless radio-frequency signals; and
   transmitting, by the system, the digital electrical signal to a device to store the information associated with the digital electrical signal.

2. The method of claim 1, further comprising determining, by the system, a direction and a rate of travel corresponding to the plurality of wireless communication devices relative to a radio-frequency receiver apparatus.

3. The method of claim 2, wherein the information further indicates the direction and the rate of travel corresponding to the plurality of wireless communication devices relative to the radio-frequency receiver apparatus.

4. The method of claim 1, wherein the information further indicates a signal strength associated with the plurality of wireless radio-frequency signals.

5. The method of claim 1, wherein the information further indicates a number of the plurality of wireless radio-frequency signals.

6. The method of claim 1, further comprising:
   comparing the digital electrical signal to a threshold value; and
   generating an output control signal based on a result of comparing the digital electrical signal to the threshold value.

7. The method of claim 6, wherein the output control signal causes a message to be transmitted to the plurality of wireless communication devices.

8. The method of claim 6, wherein the output control signal causes a message to be transmitted to a wireless communication device in a cellular wireless communications cell other than a cellular wireless communications cell corresponding to the plurality of wireless communication devices.

9. The method of claim 1, further comprising converting, by the system, using a mixer circuit, each of the plurality of wireless radio-frequency signals to a common composite frequency to produce a common composite frequency signal to be used to generate an analog electrical signal.

10. The method of claim 9, wherein generating the digital electrical signal comprises converting the analog electrical signal to the digital electrical signal.

* * * * *